United States Patent [19]

Kim

[11] Patent Number: 5,175,620
[45] Date of Patent: Dec. 29, 1992

[54] SYNCHRONISM DETECTING CIRCUIT UTILIZING PULSE WIDTH

[75] Inventor: Cheol-min Kim, Anyang, Rep. of Korea

[73] Assignee: Samsung Electronics Co., Ltd., Kyungki, Rep. of Korea

[21] Appl. No.: 771,806

[22] Filed: Oct. 8, 1991

Related U.S. Application Data

[63] Continuation of Ser. No. 503,981, Apr. 4, 1990, abandoned.

[30] Foreign Application Priority Data

Nov. 14, 1989 [KR] Rep. of Korea .................. 89-16804

[51] Int. Cl.⁵ ............................................. H04N 5/10
[52] U.S. Cl. .................................... 358/153; 358/155
[58] Field of Search .............. 358/153, 154, 148, 155; 328/139

[56] References Cited

U.S. PATENT DOCUMENTS

| 4,459,612 | 7/1984 | Shinkai et al. | 358/154 |
| 4,736,162 | 4/1988 | Ishihara | 358/153 |
| 4,891,705 | 1/1990 | Suzuki et al. | 358/148 |
| 5,025,496 | 6/1991 | Canfield | 358/148 X |

Primary Examiner—Victor R. Kostak
Attorney, Agent, or Firm—Robert E. Bushnell

[57] ABSTRACT

A synchronizing detecting circuit removing video and audio noises by discriminating the non-broadcasting channels from the broadcasting channels. The synchronizing detecting circuit has a first inspector for recognizing signals based on the number of pulses of the gated pulse rows supplied from a gate device during the synchronized pulse period of the received synchronizing signal, a second inspector for recognizing the synchronizing signal by inspecting the number of pulses of the gated pulse rows from the gate device during the period of the synchronized width of the synchronizing signal supplied in accordance with the output of the first inspector, and an output stabilizer for outputting synchronism detecting signals of a stabilized logic state by stabilizing the outputs of the second inspector.

24 Claims, 2 Drawing Sheets

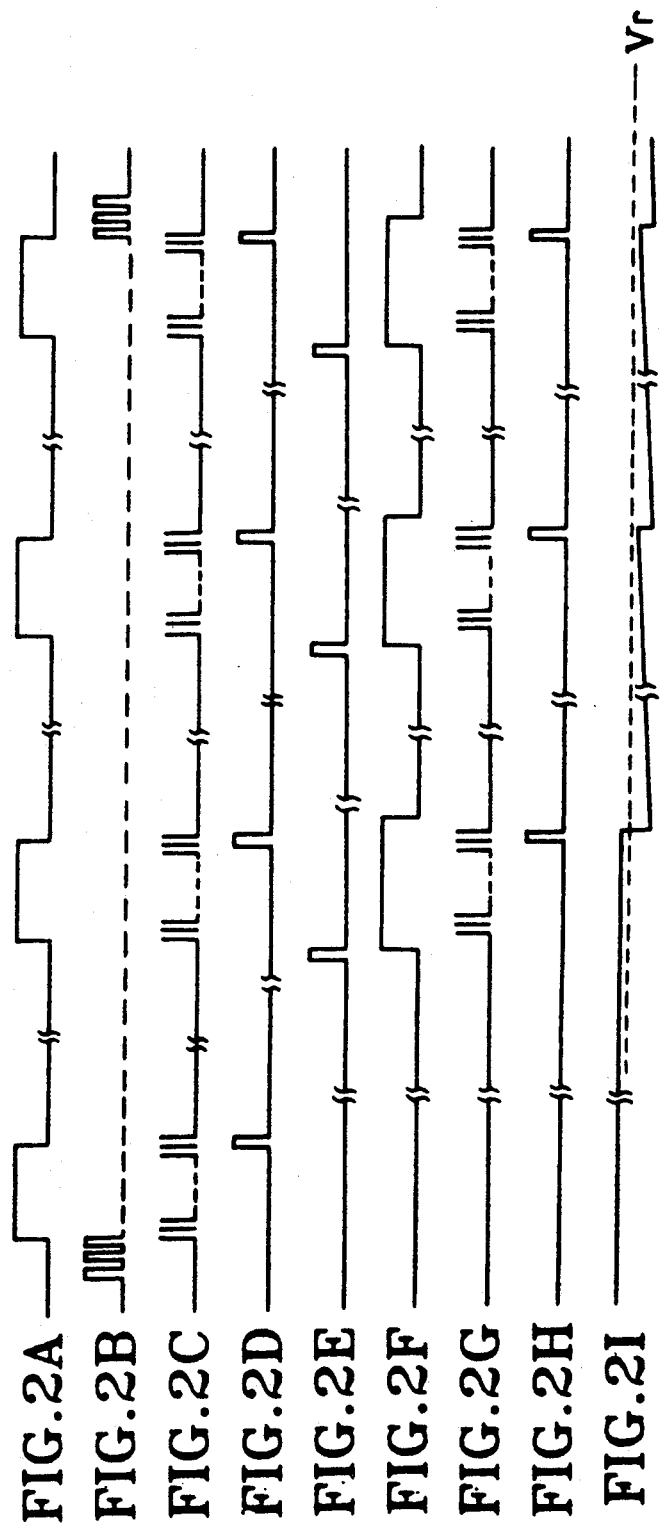

SYNCHRONISM DETECTING CIRCUIT UTILIZING PULSE WIDTH

This is a continuation of application Ser. No. 07/503,981 filed on Apr. 4, 1990 now abandoned.

FIELD OF THE INVENTION

The present invention relates to an image receiving device, and particularly to a synchronism detecting circuit by which video noises and audio noises are removed by discriminating the non-broadcasting channels from the broadcasting channels.

BACKGROUND OF THE INVENTION

Generally, image receiving devices include television, video tape recorder (to be called hereinafter "VTR") and the like, and VTR is a device which is capable of recording television image signals on a magnetic tape, and regenerating the television image signals recorded on the magnetic tape.

Among the receiving channels of television and VTR, the non-broadcasting channels which belong to the non-signal bands show ugly screens and wild noise; therefore, it is the recent trend that efforts are made to mute the sounds of the non-broadcasting channels and to furnish a blue color screen or other monochromatic screen.

Further, among the receiving channels of televisions and VTR, the non-broadcasting channels occupy a greater part of the total channels, and therefore, if there are many non-broadcasting channels between two broadcasting channels, an inconvenience is experienced in shifting from one broadcasting channel to another broadcasting channel, as well as in consuming excessive time in performing the shifting.

In order to overcome such a problem, certain kinds of televisions and VTRs are constructed to discriminate the non-broadcasting channels through utilization of the picture search function, the discriminated broadcasting channels are stored in the memory, and the non-broadcasting channels are left to be skipped, thereby saving channel shifting time.

If the non-broadcasting channels of televisions and VTRs are left free to give muted sounds and a monochromatic screen, and if the non-broadcasting channels are to be skipped, then the non-broadcasting channels have to be discriminated, and the discrimination is carried out in such manner that the existence of a synchronizing signal is detected by means of a synchronism detecting device, thereby recognizing the existence or absence of an image signal based on the detected result.

However, the conventional synchronism detecting circuit is liable to commit erroneous recognitions such that even the noise signals in the form of pulse arranged in a manner similar to the vertical synchronism and the horizontal synchronism are accepted as synchronizing signals, thereby judging a non-broadcasting channel as a broadcasting channel. Therefore such televisions and VTRs are imperfect in muting the noise and in furnishing a mono-chromatic screen, as well as being incapable of skipping the non-broadcasting channels during the image search.

SUMMARY OF THE INVENTION

Therefore, it is the object of the present invention to provide a synchronism detecting circuit utilizing a pulse width for use in an image receiving device, in which the synchronism is exactly detected by inspecting the pulse width, so that the video signals and the noise signals of non-broadcasting channels should be muted, and that the non-broadcasting channels should be exactly skipped during the channel search.

In achieving the above object, the synchronism detecting circuit according to the present invention includes:

a pulse generator for generating pulse rows;

a gate device providing detecting pulse rows generated by the pulse generator during the synchronized period of the sycnhronizing signal upon receipt of the synchronized pulse period of the received synchronizing signal;

a first inspector for recognizing the synchronizing signals based on the number of the pulses of the gated pulse rows supplied from the gate device during the synchronized pulse period of the received synchronizing signal;

a second inspector for recognizing the synchronizing signals by inspecting the number of the pulses of the gated pulse rows from the gate device during the period of the synchronized width of the synchronizing signal which is supplied in accordance with the output of the first inspector; and an output providing synchronism detecting signals of a stabilized logic state, which are stablized by the outputs of the second inspector.

BRIEF DESCRIPTION OF THE DRAWINGS

The above object and other advantages of the present invention will become more apparent by describing in detail the preferred embodiment of the present invention with reference to the attached drawings in which:

FIGS. 2A-2I show the operating waveforms of the different parts of the circuit of FIG. 1.

DESCRIPTION OF THE PREFERRED EMBODIMENT

Figure 1:
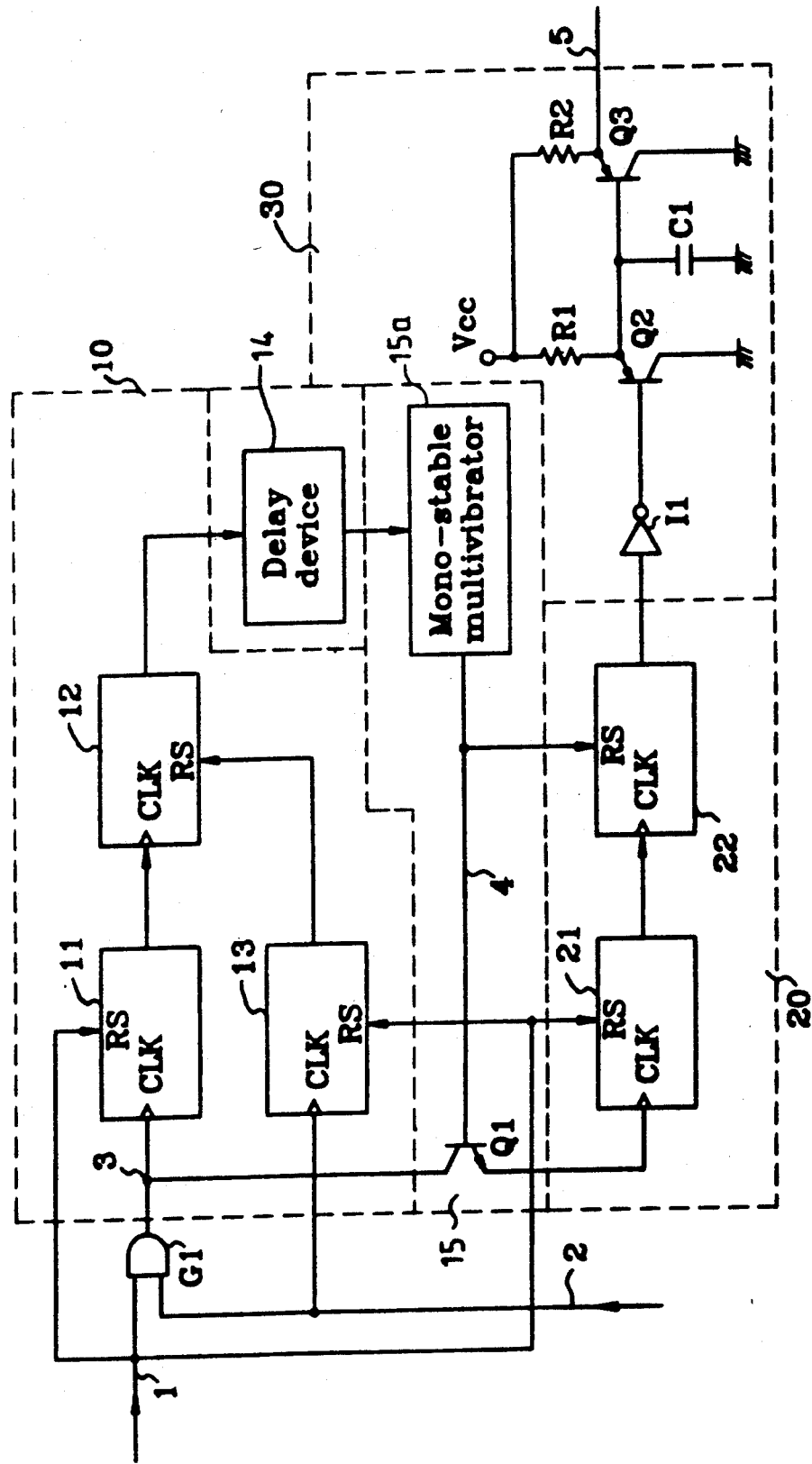
FIG. 1 shows the synchronism detecting circuit utilizing pulse width according to the present invention.

FIG. 1 shows the preferred embodiment of the circuit of the present invention.

A logic multiplying device G1 includes an input terminal connected through a line 1 to a synchronizing separator which is not showing, and another input terminal connected through a line 2 to a pulse generator which is not shown, thereby performing the function of a gate device.

A first inspector 10 comprises:

a first counter 11 including a clock terminal CLK connected through a line 3 to the output terminal of the logic multiplying device G1, and also including a reset terminal RS connected through the line 1 to the synchronizing separator.

A second counter 12 including a clock terminal CLK is connected to the output terminal of the first counter 11.

A third counter 13 including a reset terminal RS is connected through the line 1 to the synchronizing separator while a clock terminal CLK is connected through the line 2 to the pulse generator, and an output terminal connected to the reset terminal is of the second counter 12.

A device 14 is used for delaying the output of the output terminal of the second counter for a certain period of time.

The pulse row applicator 15 has a mono-stable multi-vibrator 15a for generating pulses of certain widths in accordance with the outputs of the delaying device, and for transmitting the generated pulses through a line 4, and a transistor Q1 including a collector connected through the line 3 to the output terminal of the logic multiplying device G1, and also including a base connected through the line 4 to the output terminal of the mono-stable multi-vibrator 15.

A second inspector 20 has:

a fourth counter 21 including a clock terminal connected to the emitter of the transistor Q1, and also including a reset terminal RS connected through the line 1 to the synchronizing separator and a fifth counter 22 including a reset terminal RS connected through the line 4 to the output terminal of the mono-stable multi-vibrator 15a, and also including a clock terminal connected to the output terminal of the fourth counter 21.

An output stabilizer 30 is formed with:

a transistor Q2 has a base connected through an inverting device I1 to the output terminal of the fifth counter 22, a collector connected to a reference power source GND, and an emitter connected through a resistance R1 to a supply power source Vcc;

a transistor Q3 with a base connected to the emitter of the transistor Q2, a collector connected to the reference voltage GND, and an emitter connected through a resistance R2 to the supply power source Vcc; and a condenser C1 connected between the reference power source GND and the base of the transistor Q3.

FIGS. 2A to 2I show the operating wave patterns of the different parts of the circuit of FIG. 1.

That is, FIG. 2A shows a synchronizing signal, FIG. 2B a detecting pulse row, FIG. 2C a wave pattern of the output of the logic multiplying device G1, FIG. 2D a wave pattern of the output of the second counter 12.

FIG. 2E shows a wave pattern of the output of the delay device 14, FIG. 2F shows wave pattern of the output of the mono-stable multi-vibrator 15a, FIG. 2G a wave pattern of the output of the transistor Q1, FIG. 2H a wave pattern of the output of the fifth counter 22, and FIG. 2I an operating wave pattern of the condenser C1.

The operations of the circuit of FIG. 1 will now be described referring to the wave patterns of FIGS. 2A to 2I.

The synchronizing separator means is an indispensable component in the usual televisions and VTRs, and the pulse generator is required for activating a microcomputer of a television and VTR using a microcomputer, the pulse generator being added for other purposes in televisions and VTRs which do not use a microcomputer. The detecting pulse rows from the pulse generator have an extremely short period like that of FIG. 2B, i.e., a period far smaller than the period of the synchronizing signal of FIG. 2A, and further, the synchronizing signal like that of FIG. 2A can be used either as a horizontal synchronizing signal or as a vertical synchronizing signal.

The logic multiplying device G1 receives the detecting pulse rows from the pulse generator and the synchronizing signals from the synchronizing separator into its two input terminals through the lines 1, 2. Then the logic multiplying device G1 outputs through the line 3 to the clock terminal CLK of the first counter 11 and to the collector of the transistor Q1 the detecting pulse rows which are supplied during the period when the above mentioned synchronizing signal is in a high logic state. Here, the wave pattern of the output signal of the logic multiplying device G1 becomes like that of FIG. 2C.

The first counter 11 will be in an initial state during the period of a low logic state of the synchronizing signal which is supplied through the line 1 to the reset terminal RS from the synchronizing separator. Then the first counter 11 carries out repeated countings of a first numeral (e.g., 7) in accordance with the gated pulse rows supplied through the line 3 to the clock terminal CLK from the logic multiplying device G1 during the period of high logic state. Then the first counter 11 supplies a pulse to the clock terminal CLK of the second counter 12 each time the first numeral (e.g., 7) is counted.

The third counter 13 stays in an initial state during the period of a low logic state of the synchronizing signal which is supplied from the synchronizing separator through the line 1 to the reset terminal RS. Then the third counter 13 counts a second numeral (e.g., 58) in accordance with the detecting pulse rows which are supplied from the pulse generator means through the line 2 to the clock terminal CLK. Then the third counter 13 supplies a pulse of a low logic state to the reset terminal RS of the second counter 12 each time the second numeral (e.g., 58) is counted.

The second counter 12 is initialized upon receipt of a pulse of a low logic state from the third counter 13 into the reset terminal RS, carries out increment-counting by "1" each time a pulse is supplied from the first counter 11 into the clock terminal CLK, and then, when the incrementation reaches a third numeral (e.g., 8), supplies to the delay device 14 a first synchronism detecting signal of a high logic state like that of FIG. 2D. The reason why the numerals 7,58,8 are taken as examples of the first to third numerals is that the pulse width of the synchronizing signal is preferably larger than 56 times the period of the detecting pulse and smaller than 58 times the period of the detecting pulse.

The delay device 14 delays for a certain period of time the first synchronism detecting signal from the second counter 12 as shown in FIG. 2E before supplying it to the mono-stable multi-vibrator 15a.

The mono-stable multi-vibrator 15a generates a pulse of a high logic state having a width large enough to cover the next synchronizing pulse period each time the first synchronism detecting signal is supplied from the delaying device. The mono-stable multi-vibrator 15a delivers the above mentioned pulse through the line 4 to the base of the transistor Q1 and to the reset terminal RS of the fifth counter 22, the output wave pattern of the mono-stable multi-vibrator 15a being like that of FIG. 2F.

The transistor Q1 is turned on during the period when the output of the mono-stable multi-vibrator 15a, which is supplied through the line 4 into the base, is in a high logic state. The output of the logic multiplying device G1 which receives its input through the line 3 into its collector is supplied through the emitter of the transistor Q1 to the clock terminal CLK of the fourth counter 21 by the transistor Q1. Here, the wave pattern of the output of the transistor Q1 becomes like that of FIG. 2G.

The fourth counter 21 stays in an initial state during the period of a low logic state of the synchronizing signal which is supplied from the synchronizing separator through the line 1 to the reset terminal RS. Then the fourth counter 21 counts up to a first numeral (e.g., 7) in accordance with the pulse rows which are supplied from the emitter of the transistor Q1 to the clock terminal CLK. Then the fourth counter 21 supplies a pulse to the clock terminal CLK of the fifth counter 22 each time the first numeral (e.g., 7) is counted.

The fifth counter 22 stays in an initial state during the period when the output of the mono-stable multi-vibrator 15a, which is supplied through the line 4 to the reset terminal RS, is in a low logic state. During the period of a high logic state, the fifth counter 22 carries out an increment-counting by "1" each time a pulse is supplied from the fourth counter 21 to the clock terminal CLK, until a second numeral (e.g., 8) is formed. Then, each time a second numeral (e.g., 8) is formed (counted), the fifth counter 22 supplies a high logic state pulse in the form of a second synchronism detecting signal to the base of the transistor Q2 through an inverting device 11. Here, the wave pattern of the output of the fifth counter 22 is as shown in FIG. 2H. The reason why the first to third numerals of the fourth to fifth counters 21, 22 are made to be the same as those of the first to second counters 11,12 is that they are made so for sake of the descriptional convenience, and therefore, they can be set in values different from those of the first and second counters 11, 12 in order to provide a permissible range.

The transistor Q2 is turned on during each pulse period of the second synchronism detecting signals which are the outputs of the fifth counter 22, and which are inverted by the inverting device 11 and are supplied to the base of the transistor Q2, with the result that the transistor Q2 discharges the whole voltage charged into the condenser C1.

The condenser C1 discharges its own charged voltage through both the emitter and the collector of the transistor Q2 during the time when the transistor Q2 is turned on, and then, slowly receives the charging voltage from the time when the transistor Q2 is turned off. Under this condition, the charging speed of the condenser C1 is determined by the multiplication of the resistance value of the resistor R1 and the capacitance value of the condenser C1, and therefore, the charging and discharging wave patterns of the condenser C1 become like the wave pattern of FIG. 2I.

The transistor Q3 is turned on by the transistor Q2, and the turned-on state of the transistor Q3 maintained until the charging voltage of the condenser C1 rises up to the turn-off voltage after reaching the reference voltage Vr of FIG. 2I. Thereupon, the transistor Q3 transmits a stabilized synchronism detecting signal of a low logic state through the line 5 which is connected to its emitter.

If the output of the transistor Q3 is to be kept in a stabilized logic state during the time when the synchronizing signals are continuously detected, the time constants of the resistance R1 and the condenser C1 have to be provided in larger numbers than the period of the synchronizing signal.

According to the present invention as described above, the detection of a synchronizing signal is recognized only in the case where the pulse width of the received synchronizing signal corresponds to the reference pulse width of the synchronizing signal through two rounds, and therefore, the synchronizing signals can be detected in an exact manner.

Further, owing to the exact detection of the synchronizing signals, the existence or absence of image signals, i.e., broadcasting signals on non-broadcast signals can be exactly discriminated, with the result that the muting of noise and the provision of a monochromatic screen can be carried out without fail, as well as skipping the non-broadcasting channels when shifting the channel.

What is claimed is:

1. A synchronism detecting circuit utilizing pulse width for use in an image receiving device having synchronizing separator means for providing a synchronizing signal, and means for generating pulse rows, comprising:
    a gate device for gating said pulse rows during a synchronized pulse period of said synchronizing signal upon receipt of said synchronizing signal to provide gate pulse rows;
    first inspecting means for recognizing said synchronizing signal based on the number of pulses of a first application of said gated pulse rows during said synchronized pulse period of said synchronizing signal;
    delay means for providing a delay pulse by delaying the output of said first inspecting means for a predetermined time period;
    pulse row applying means for providing an operational signal containing the pulse width on a basis of said delay pulse, and for applying the output signal to control a second application of said gated pulse rows from said gate device;
    second inspecting means for recognizing said synchronizing signals by inspecting the number of the pulses of said second application of said gated pulse rows during the period of said synchronizing signal in accordance with the output of said first inspecting means; and
    output stabilizing means for providing synchronism detecting signals of a stabilized logic state by stabilizing the outputs with said second inspecting means.

2. The synchronism detecting circuit as claimed in claim 1, wherein said first inspecting means comprises:
    a first plurality of counting means for counting the number of the pulses of said gated pulse rows, and generating a first synchronism detecting signal in the form of a first pulse when a first predetermined value is counted.

3. The synchronism detecting circuit as claimed in claim 2, wherein said second inspecting means comprises:
    a second plurality of counting means for counting the number of the pulses of said gated pulse rows, and generating a second synchronism detecting signal in the form of a second pulse when a second predetermined value is counted, and for supplying said second synchronism detecting signal to said output stabilizing means.

4. The synchronism detecting circuit as claimed in claim 1, wherein said pulse row applying means comprises:
    a mono-stable multi-vibrator for generating the operational signal in the form of a first pulse having a width co-extensive with both a starting point and ending point corresponding to said delay pulse from said delay means and the output of said first inspecting means, and for supplying said operational signal to said second inspecting means; and
    a transistor for sampling said gated pulse rows supplied in said second application from said gate device in response to said operational signal.

5. The synchronism detecting circuit as claimed in claim 2, wherein said pulse row applying means comprises:
- a mono-stable multi-vibrator for generating the operational signal in the form of a second pulse having a width co-extensive with both a starting point and ending point corresponding to said delay pulse from said delay means and said output of said first inspecting means, and for supplying said operational signal to said second inspecting means; and
- a transistor for sampling said gated pulse rows supplied in said second application from said gate device in response to said operational signal.

6. The synchronism detecting circuit as claimed in claim 3, wherein said pulse row applying means comprises:
- a mono-stable multi-vibrator for generating the operational signal in the form of a third pulse having a width co-extensive with both a starting point and ending point corresponding to said delay pulse from said delay means and said output of said first inspecting means, and for supplying said operational signal to said second inspecting means; and
- a transistor for sampling said gated pulse rows supplied in said second application from said gate device in response to the said operational signal.

7. A synchronism detecting circuit, comprising:
- means for generating a plurality of gated pulse signals in dependence upon reception of a pulse row signal and a synchronizing signal exhibiting a pulse width;
- first synchronism detecting means for making first counts of said gated pulse signals during synchronized pulses of said synchronizing signal, and for generating first output pulses in dependence upon said first counts;
- second synchronism detecting means for making second counts of said gated pulse signals during said pulse width, and for generating second output pulses in dependence upon said second counts; and
- means for controlling timing of said making of said second counts by said second synchronism detecting means, in dependence upon said first output pulses.

8. The circuit of claim 7, further comprised of said first and second synchronism detecting means being reset by said synchronizing signal.

9. The circuit of claim 7, wherein said first synchronism detecting means comprises:
- a first counter for providing a first specific count of said gated pulse signals, a second counter providing a second specific counter of said pulse row signal; and
- a third counter for providing said first output pulses in dependence upon said first and second specific counts.

10. The circuit of claim 7, wherein said second synchronism detecting means comprises:
- a first counter for providing a first specific count of said gated pulse signals; and
- a second counter for providing said second output pulses by making a second specific counter in dependence upon said first specific count and said first output pulses.

11. The circuit of claim 9, wherein:
said first synchronism detecting means comprises a first counter for providing a first specific count of said gated pulse signals, a second counter for providing a second specific count of said pulse row signal, and a third counter for providing said first output pulses in dependence upon said first and second specific counts; and
said second synchronism detecting means comprises a fourth counter for providing a third specific count of said gated pulse signals, and a fifth counter for providing said second output pulses by making a fourth specific count in dependence upon said third specific count and said first output pulses.

12. The circuit of claim 11, further comprised of said controlling means being interposed to control transmission of said first output pulses between said third counter and said fifth counter, and interposed to control transmission of said gated pulse signals between said generating means and said fourth counter.

13. The circuit of claim 7, wherein:
said first synchronizing means comprises:
- a first counter having a clock terminal coupled to receive said gated pulse signals, and an output terminal, for providing a first specific count of said gated pulse signals;
- a second counter having a clock terminal coupled to receive said pulse row signal and an output terminal, for providing a second specific count of said gated pulse signals;
- a third counter having a clock terminal coupled to receive said first specific count, a reset terminal coupled to receive said second count, and an output terminal for providing said first output pulses; and said second synchronizing means comprises:
- a fourth counter having a clock terminal coupled to receive said gated pulse signals, and an output terminal for providing a third specific count of said gated pulse signals; and
- a fifth counter having a clock terminal coupled to receive said third specific count, a reset terminal coupled to said controlling means, and an output terminal for providing said second output pulses.

14. The circuit of claim 13, further comprised of said first, second and fourth counters having reset terminals coupled to receive said synchronizing signal, and said controlling means for providing a control signal having a second width greater than said pulse width.

15. The circuit of claim 13, further comprised of said first, second and fourth counters having reset terminals coupled to receive said synchronizing signal, and said controlling means comprising:
- means coupled between said output terminal of said third counter, for delaying transmission of said first output pulses;
- means coupled to receive said first output pulses delayed by said delaying means, for providing to said reset terminal of said fifth counter control signals having a second width greater than said pulse width; and
- switching means interposed between said generating means and said clock terminal of said fourth counter, for enabling transmission of said gated pulse signals to said clock terminal of said fourth counter in response to said control signals.

16. A process for detecting synchronism, comprising:
generating a plurality of gated pulse signals in dependence upon reception of a pulse row signal and a synchronizing signal exhibiting a pulse width;
making first counts of said gated pulse signals during said pulse width of said synchronizing signal, and generating first output pulses in dependence upon said first counts;

making second counts of said gated pulse signals during said pulse width, and generating second output pulses in dependence upon said second counts; and controlling timing of said making of said second counts, in dependence upon said first output pulses.

17. The process of claim 16, further comprised of restarting said first and second counts in dependence upon reception of said synchronizing signal.

18. The process of claim 16, wherein said step of making said first counts and generating said first output pulses comprises the steps of:

providing a first specific count of said gated pulse signal;

providing a second specific count of said pulse row signal; and generating said first output pulses in dependence upon said first and second specific counts.

19. The process of claim 16, wherein said step of making said second counts and generating said second output pulses comprises the steps of:

providing a first specific count of said gated pulse signals; and generating said second output pulses in dependence upon said first specific count and said first output pulses.

20. The process of claim 168 wherein said step of making said first counts and generating said first output pulses comprises the steps of:

providing a first specific count of said gated pulse signals;

providing a second specific count of said pulse row signal; and generating said first output pulses in dependence upon said first and second specific counts; and said step of making said second counts and generating said second output pulses comprises the steps of:

providing a third specific count of said gated pulse signals; and generating said second output pulses by making a fourth specific count in dependence upon said third specific count and said first output pulses.

21. The process of claim 20, further comprises of making said first specific count and said third specific count on a first common base, and making said second specific count and said fourth specific count on a second common base.

22. The process of claim 20, further comprised of stabilizing said second output pulses.

23. A synchronous detecting circuit, comprising:

gate means coupled to receive a plurality of row pulses and a plurality of first synchronous pulses of a first width, for providing a plurality of gate pulses;

first counter means having a reset terminal coupled to receive said plurality of first synchronous pulses and a clock terminal coupled to receive said plurality of gate pulses, for counting a number of said gate pulses within each first synchronous pulse having said first width of said plurality of first synchronous pulses up to a first selected number to provide a first intermediate pulse corresponding to said first selected number;

second counter means having a reset terminal coupled to receive said plurality of said first synchronous pulses and a clock terminal coupled to receive said plurality of row pulses, for counting a number of said row pulses up to a second number to provide a second intermediate pulse corresponding to said second selected number;

third counter means having a reset terminal coupled to receive said second intermediate pulse and a clock terminal coupled to receive said first intermediate pulse, for counting a number of said first intermediate pulse up to a third selected number to provide a plurality of first synchronous detected pulses;

delay means for delaying said plurality of first synchronous detected pulses for a predetermined time period to provide a plurality of delayed pulses;

mono-stable multivibrator means coupled to receive said plurality of delayed pulses, for providing a plurality of second synchronous pulses of a second width;

means for enabling transmission of said plurality of gate pulses in dependence upon reception of said plurality of second synchronous pulses to provide a plurality of transmitted gate pulses;

fourth counter means having a reset terminal coupled to receive said plurality of first synchronous pulses and a clock terminal coupled to receive said plurality of transmitted gate pulses, for counting a number of said transmitted gate pulses with each first synchronous pulse having said first width of said plurality of first synchronous pulses up to a fourth selected number to provide a third intermediate pulse corresponding to said fourth selected number;

fifth counter means having a reset terminal coupled to receive said plurality of second synchronous pulses and a clock terminal coupled to receive said third intermediate pulse, for counting occurrences of said third intermediate pulse up to a fifth selected number to provide a plurality of second synchronous detected pulses; and stabilizer means for stabilizing logic states of said plurality of second synchronous detected pulses.

24. The synchronous detecting circuit as claimed in claim 23, wherein said stabilizer means is a double-stage amplifier, and means for enabling transmission of said plurality of gate pulses is a transistor having a base coupled to receive said plurality of second synchronous pulses and a collector coupled to receive said plurality of gate pulses, and an emitter for providing said plurality of transmitted gate pulses.

* * * * *

UNITED STATES PATENT AND TRADEMARK OFFICE
CERTIFICATE OF CORRECTION

PATENT NO. : 5,175,620
DATED : 29 December 1992
INVENTOR(S) : Cheol- Min Kim

It is certified that error appears in the above-indentified patent and that said Letters Patent is hereby corrected as shown below:

| | |
|---|---|
| Column 1, Line 55 | after "of " change "pulse" to --pulses--; |
| Column 2, Line 47 | After "not" change "showing" to --shown--; |
| Line 51 | After "10" change "comprises" to --has--; |
| Line 66 | after "A" insert --delay--; |
| Column 3, Line 48 | after "separator" delete "means"; |
| Column 5, Line 68 | after "i.e.," change "broadcasting" to --broadcast--; |
| IN THE CLAIMS | |
| Column 9, Line 29 | after "claim" change "168" to --16,--: |

Signed and Sealed this

Fifteenth Day of October, 1996

*Attest:*

BRUCE LEHMAN

*Attesting Officer*   *Commissioner of Patents and Trademarks*